United States Patent
Forrest et al.

(10) Patent No.: US 9,950,562 B2
(45) Date of Patent: Apr. 24, 2018

(54) WHEEL DRIVE TRANSMISSION UNIT

(71) Applicant: AUBURN GEAR, INC., Auburn, IN (US)

(72) Inventors: James L. Forrest, Ashley, IN (US); John T. Fortman, Auburn, IN (US); Dan M. Metzger, Fort Wayne, IN (US); Don T. Walters, Auburn, IN (US); Joseph A. Beals, Edgerton, OH (US); Craig A. Wisner, Wauwatosa, WI (US)

(73) Assignee: Auburn Gear, Inc., Auburn, IN (US)

( * ) Notice: Subject to any disclaimer, the term of this patent is extended or adjusted under 35 U.S.C. 154(b) by 23 days.

(21) Appl. No.: 14/438,158

(22) PCT Filed: Mar. 1, 2013

(86) PCT No.: PCT/US2013/028657
§ 371 (c)(1),
(2) Date: Apr. 23, 2015

(87) PCT Pub. No.: WO2014/065851
PCT Pub. Date: May 1, 2014

(65) Prior Publication Data
US 2015/0273940 A1    Oct. 1, 2015

Related U.S. Application Data

(60) Provisional application No. 61/718,506, filed on Oct. 25, 2012.

(51) Int. Cl.
*F16H 1/46* (2006.01)
*B60B 27/00* (2006.01)
(Continued)

(52) U.S. Cl.
CPC ........ *B60B 27/0021* (2013.01); *B60K 17/046* (2013.01); *B60T 1/062* (2013.01); *F16H 1/46* (2013.01); *F16H 57/10* (2013.01)

(58) Field of Classification Search
None
See application file for complete search history.

(56) References Cited

U.S. PATENT DOCUMENTS 1,380,547 A    6/1921   Farmer
2,386,917 A   10/1945   Thornton
(Continued)

FOREIGN PATENT DOCUMENTS

EP         2135767      12/2009

OTHER PUBLICATIONS

International Search Report and Written Opinion dated May 13, 2013 from the ISA in related International Application No. PCT/US2013/028657.

(Continued)

*Primary Examiner* — Robert W Hodge
*Assistant Examiner* — Lori Wu
(74) *Attorney, Agent, or Firm* — Faegre Baker Daniels LLP

(57) ABSTRACT

Structural arrangements of wheel drive components facilitate the use of robust main roller bearings that are widely spaced apart from one another. This wide spacing minimizes the torque borne by the bearings for a given external load, because at least one bearing is placed closer to the expected load application point (e.g., the center of gravity of the wheel attached to the wheel hub of the drive unit). The present wheel drive bearings can support a heavy external load without expanding the overall size and configuration of a given wheel drive application.

23 Claims, 12 Drawing Sheets

(51) Int. Cl.
    *B60K 17/04*    (2006.01)
    *B60T 1/06*    (2006.01)
    *F16H 57/10*    (2006.01)

(56) References Cited

U.S. PATENT DOCUMENTS

| | | | |
|---|---|---|---|
| 2,529,330 A | 11/1950 | Double | |
| 3,115,204 A * | 12/1963 | Dence | B60K 17/046 |
| | | | 180/10 |
| 3,125,363 A | 3/1964 | Kapusta | |
| 3,150,532 A | 9/1964 | Bixby | |
| 3,430,523 A | 3/1969 | Merritt | |
| 3,756,095 A | 9/1973 | McCay, Jr. et al. | |
| 3,770,074 A | 11/1973 | Sherman | |
| 3,951,481 A | 4/1976 | Ritter, Jr. | |
| 4,020,716 A | 5/1977 | Toth et al. | |
| 4,037,694 A | 7/1977 | Keese | |
| 4,043,226 A | 8/1977 | Buuck | |
| 4,091,688 A | 5/1978 | Huffman | |
| 4,142,615 A | 3/1979 | Sidles, Jr. et al. | |
| 4,158,971 A | 6/1979 | Szalai et al. | |
| 4,159,657 A | 7/1979 | Stilley | |
| 4,186,626 A | 2/1980 | Chamberlain | |
| 4,317,498 A | 3/1982 | Jirousek et al. | |
| 4,334,590 A | 6/1982 | Plumb | |
| 5,024,636 A | 6/1991 | Phebus et al. | |
| 5,478,290 A | 12/1995 | Buuck et al. | |
| 5,588,931 A | 12/1996 | Forster | |
| 6,117,040 A | 9/2000 | Watterodt et al. | |
| 6,290,048 B1 * | 9/2001 | Kohlmeier | B60K 17/046 |
| | | | 192/221.1 |
| 6,458,057 B2 | 10/2002 | Massaccesi et al. | |
| 6,811,514 B2 | 11/2004 | Bowman | |
| 6,814,684 B2 | 11/2004 | Schulz et al. | |
| 7,530,416 B2 | 5/2009 | Suzuki | |
| 8,062,160 B2 | 11/2011 | Shibukawa | |
| 8,133,143 B2 | 3/2012 | Schoon | |
| 2001/0035012 A1 | 11/2001 | Smith | |
| 2009/0032321 A1 | 2/2009 | Marsh et al. | |
| 2009/0101376 A1 | 4/2009 | Walker et al. | |
| 2009/0312134 A1 * | 12/2009 | Schoon | H02K 7/1025 |
| | | | 475/154 |
| 2010/0285914 A1 | 11/2010 | Wenthen | |
| 2011/0130238 A1 | 6/2011 | Schoon | |
| 2012/0196715 A1 * | 8/2012 | Turner | B60K 17/046 |
| | | | 475/159 |
| 2012/0202640 A1 * | 8/2012 | Morimoto | B60K 17/046 |
| | | | 475/323 |
| 2012/0238389 A1 | 9/2012 | Schoon | |
| 2013/0161148 A1 * | 6/2013 | Schoon | B60T 1/062 |
| | | | 192/219.4 |

OTHER PUBLICATIONS

International Preliminary Report on Patentability dated Apr. 28, 2015 from the International Bureau in related International Patent Application No. PCT/US2013/028657.

European Search Report in corresponding European Patent Application No. 13849472.9, dated May 9, 2017.

* cited by examiner

FIG_1
PRIOR ART

FIG_2

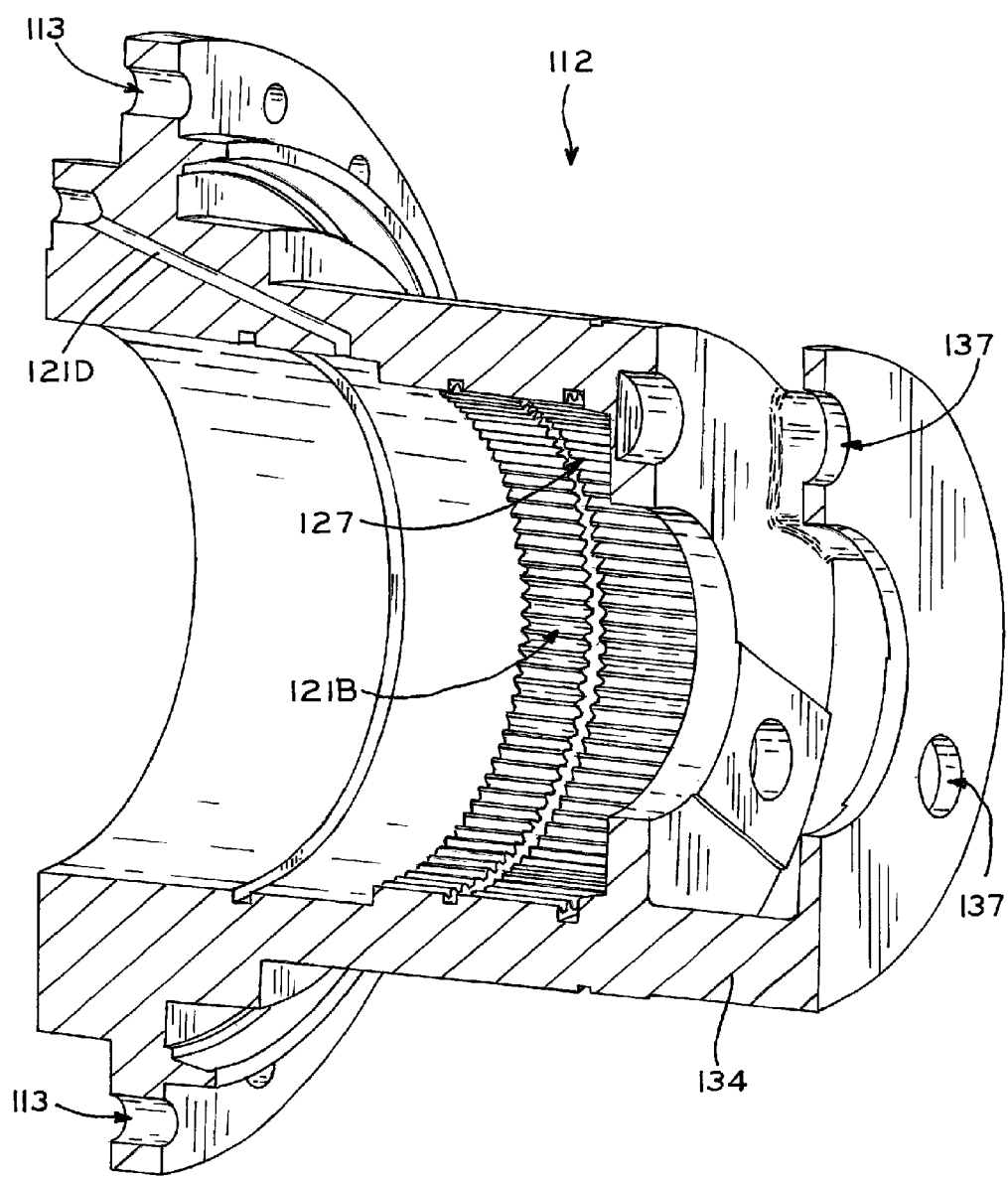
FIG_5

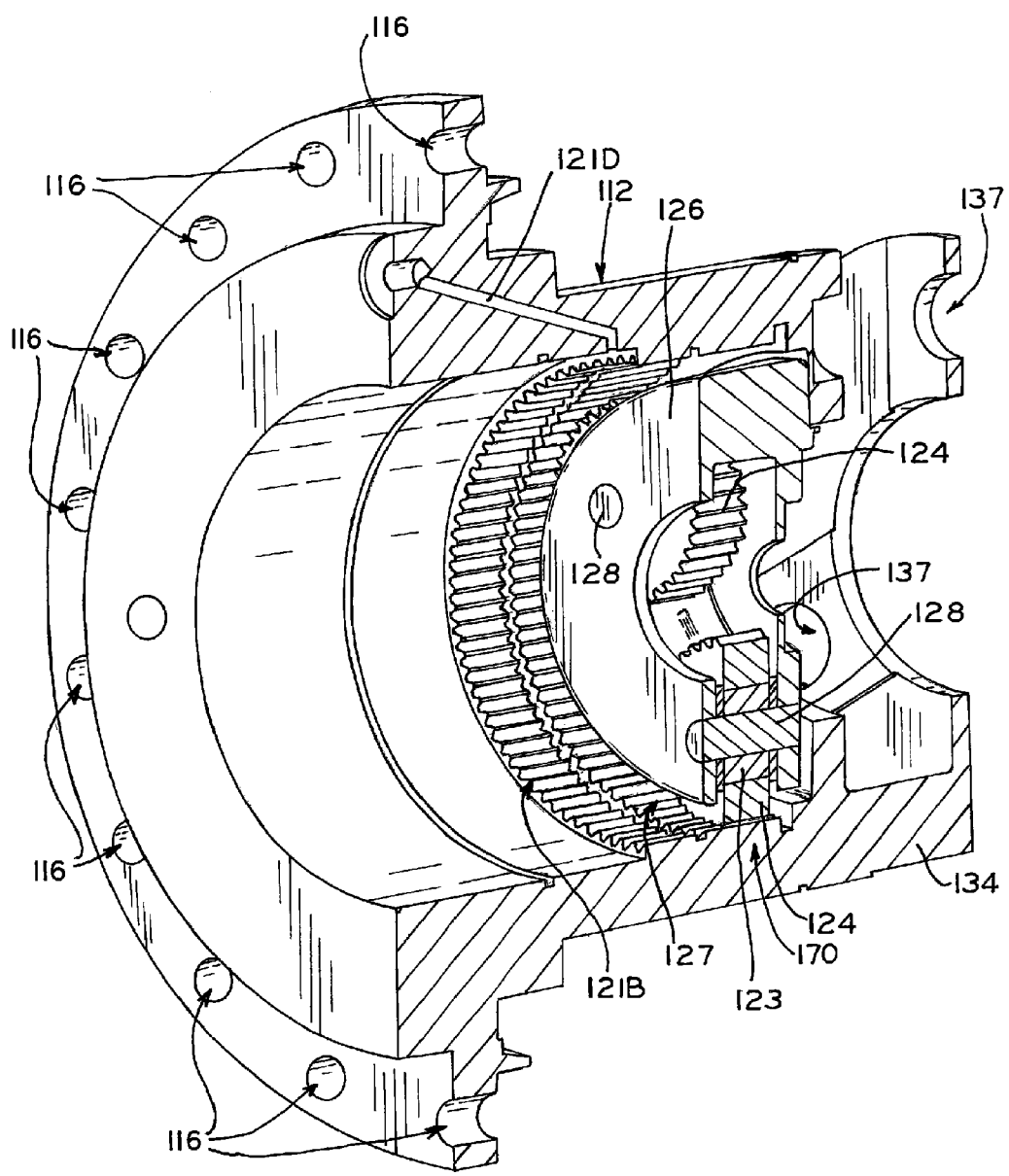
FIG_6A

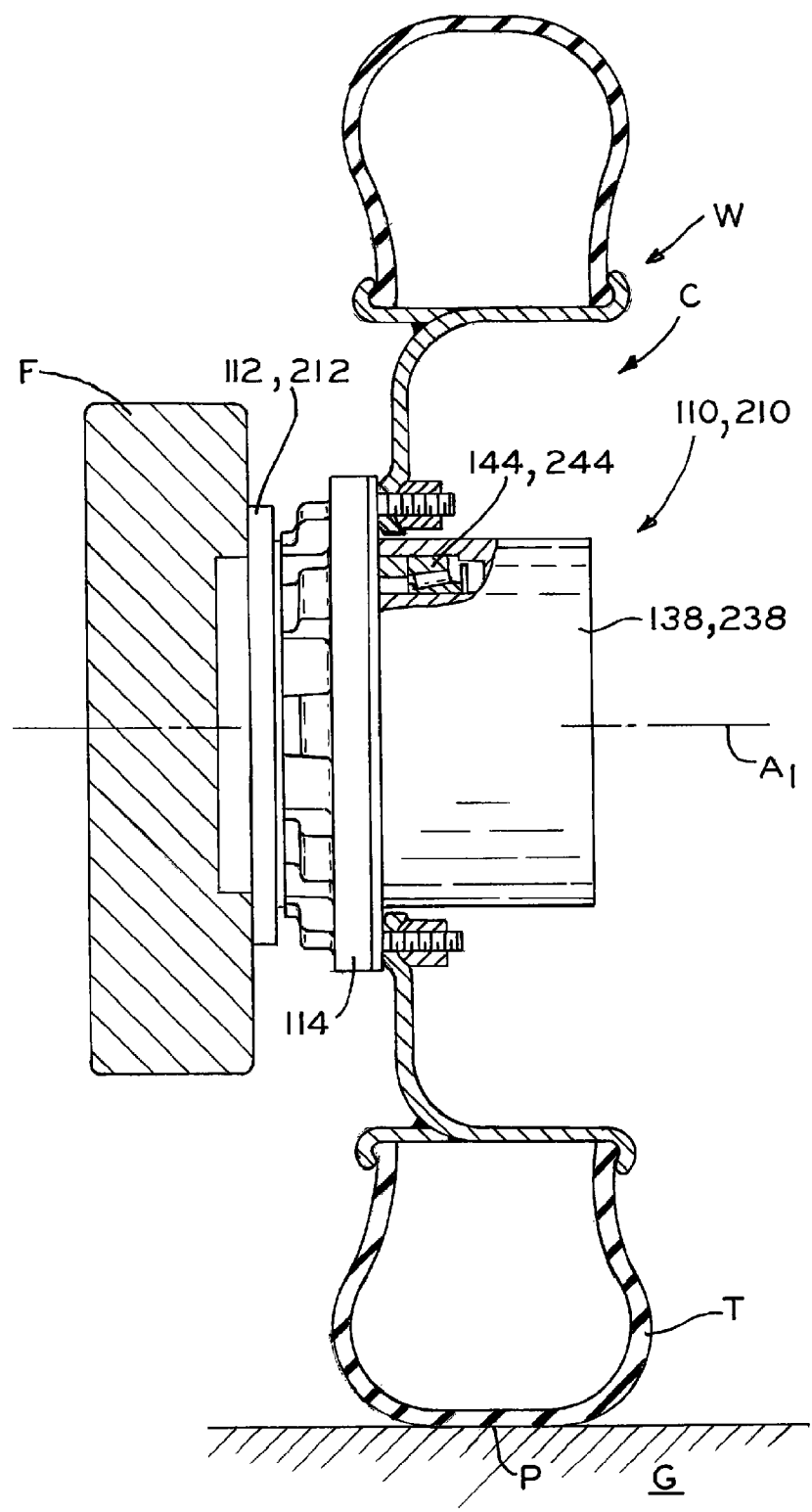
FIG_10

WHEEL DRIVE TRANSMISSION UNIT

CROSS REFERENCE TO RELATED APPLICATION

The present application claims the benefit under Title 35, U.S.C. Section 119(e) of U.S. Provisional Patent Application Ser. No. 61/718,506, filed Oct. 25, 2012 and entitled WHEEL DRIVE TRANSMISSION UNIT, the entire disclosure of which is hereby expressly incorporated herein by reference.

BACKGROUND

1. Technical Field

The present disclosure relates to vehicle power transmission units, and, more particularly, to wheel-mounted gear reduction units.

2. Description of the Related Art

Wheel drives are used to provide gear reduction at or near the point of service, such as at the hub of a driven wheel. Wheel drives may be used for the large driven wheels commonly found on construction equipment and earth moving vehicles, for example, or for auger bits used in drilling post holes in the ground.

Referring to FIG. 1, a known wheel drive 10 includes a planetary gear system functionally interposed between spindle 12 and wheel hub 14. Spindle 12 is designed to affix to a vehicle frame (not shown), while wheel hub 14 is designed to attach to a vehicle wheel via mounting bolts received in bolt holes 16. When so configured, the planetary gear system operates to receive power from the vehicle motor via an input shaft, and to increase torque and decrease rotational speed of the driven wheel with respect to the input shaft.

The planetary system includes primary planetary stage 70 and secondary planetary stage 80. Primary stage 70 includes sun gear 20 and ring gear 38, with planet gears 24 interposed therebetween and carried on planet gear carrier 26 via respective planet gear axles 28. Primary stage 70 receives power at input coupler 18, which transfers input torque to sun gear 20 via disconnect shaft 22. Secondary stage 80 receives its input from primary planet gear carrier 26 of primary stage 70 via secondary sun gear 30, which is rotationally fixed to carrier 26. Secondary stage 80 provides further gear reduction via secondary planet gears 32 carried on secondary planet gear carrier 34 via respective secondary planet gear axles 36.

Ring gear 38 is driven by both primary and secondary planet gears 24, 32, such that the primary and secondary planetary gear stages 70 and 80 cooperate to substantially reduce the speed of ring gear 38 with respect to input coupler 18 and primary sun gear 20. Ring gear 38 is, in turn, fixed to hub 14 by bolts 40, so the reduced speed and concomitant increase in available torque resulting from the gear reduction is made available to the driven wheel.

Wheel drive 10 utilizes a pair of roller bearings 42, 44 to facilitate the rotation of hub 14 over spindle 12. As shown in FIG. 1, bearings 42, 44 are both disposed between spindle 12, and wheel hub 14.

Roller bearings may be heavily loaded components when used in wheel drives such as wheel drive 10. For example, when a wheel is mounted to the wheel hub and the drive unit is placed in service, the bearings must bear the weight of the vehicle and absorb the dynamic, chaotic forces associated with vehicle operation. These dynamic forces may be particularly acute in certain applications, such as in off-road vehicles, earth-moving equipment, construction and demolition vehicles, etc.

SUMMARY

The present disclosure provides structural arrangements of wheel drive components that facilitate the use of robust main roller bearings that are widely spaced apart from one another. This wide spacing minimizes the torque borne by the bearings for a given external load, because at least one bearing is placed closer to the expected load application point (e.g., the center of gravity of the wheel attached to the wheel hub of the drive unit). The present wheel drive bearings can support a heavy external load without expanding the overall size and configuration of a given wheel drive application.

In one form thereof, the present disclosure provides a wheel drive transmission unit comprising: a spindle defining a longitudinal spindle axis, the spindle configured to affix to a vehicle frame at an input side of the transmission unit; a hub defining a longitudinal hub axis, the hub rotatable with respect to the spindle about the longitudinal hub axis and configured to affix to a driven wheel at an output side of the transmission unit; a primary planetary stage functionally interposed between the spindle and the hub, the primary planetary stage comprising: a primary input component positioned and configured to receive power from a vehicle power source; a plurality of primary planet gears in splined engagement with the primary input component; a primary planet gear carrier rotatably attached to each of the plurality of primary planet gears; and a primary ring gear in splined engagement with each of the plurality of primary planet gears, one of the primary planet gear carrier and the primary ring gear comprising a primary output component operably coupled to the hub such that the hub rotates at a rotational speed slower than the primary input component when the primary input component receives power; an input-side bearing mounted to an outer wall of the spindle and occupying a first space between the outer wall of the spindle and an inner wall of the hub, such that the input-side bearing rotatably supports the hub; and an output-side bearing mounted to the outer wall of the spindle at a location spaced axially from the input-side bearing by a bearing spacing distance, the output-side bearing occupying a second space between the outer wall of the spindle and an inner wall of the primary ring gear, the second space larger than the first space whereby the output-side bearing has a larger overall cross-section as compared to the input-side bearing.

In another form thereof, the present disclosure provides a wheel drive transmission unit comprising: a spindle defining a longitudinal spindle axis, the spindle configured to affix to a vehicle frame at an input side of the transmission unit; a hub defining a longitudinal hub axis, the hub rotatable with respect to the spindle about the longitudinal hub axis and configured to affix to a driven wheel at an output side of the transmission unit; a primary planetary stage functionally interposed between the spindle and the hub, the primary planetary stage comprising: a primary input component positioned and configured to receive power from a vehicle power source; a plurality of primary planet gears in splined engagement with the primary input component; a primary planet gear carrier rotatably attached to each of the plurality of primary planet gears; and a primary ring gear monolithically formed as part of the spindle, the primary ring gear in splined engagement with each of the plurality of primary planet gears, such that the primary input component, the plurality of primary planet gears and the primary planet gear carrier are disposed radially inwardly of the primary ring gear formed in the spindle; a secondary planetary stage functionally interposed between the spindle and the hub, the secondary planetary stage comprising: a secondary input component positioned and configured to receive power from the primary planet gear carrier of the primary planetary stage; a plurality of secondary planet gears in splined engagement with the secondary input component; a secondary planet gear carrier rotatably attached to each of the plurality of secondary planet gears, the secondary planet gear carrier monolithically formed as part of the spindle; and a secondary ring gear in splined engagement with each of the plurality of secondary planet gears, the secondary ring gear comprises a secondary output component, the secondary ring gear operably affixed to the hub such that the hub rotates at a rotational speed slower than the primary input component and the secondary input component when power is transmitted through the primary and secondary planetary stages.

In yet another form thereof, the present disclosure provides a wheel drive transmission unit comprising: a spindle defining a longitudinal spindle axis, the spindle configured to affix to a vehicle frame at an input side of the transmission unit; a hub defining a longitudinal hub axis, the hub rotatable with respect to the spindle about the longitudinal hub axis and configured to affix to a driven wheel at an output side of the transmission unit; a primary planetary stage comprising: a primary input component positioned and configured to receive power from a vehicle power source; a plurality of primary planet gears in splined engagement with the primary input component; a primary planet gear carrier rotatably attached to each of the plurality of primary planet gears, the primary planet gear carrier including an output-side surface comprising a plurality of recesses formed therein; and a primary ring gear in splined engagement with each of the plurality of primary planet gears; a secondary planetary stage comprising: a secondary input component including a sun gear portion and a plurality of face splines protruding axially away from the sun gear portion, the secondary input component axially moveable to selectively engage or disengage the face splines with the recesses of the primary planet gear carrier, such that the secondary input component receives power from the primary planet gear carrier when the secondary input component is axially moved into its engaged position; a plurality of secondary planet gears in splined engagement with the secondary input component; a secondary planet gear carrier rotatably attached to each of the plurality of secondary planet gears; and a secondary ring gear in splined engagement with each of the plurality of secondary planet gears, the secondary ring gear operably affixed to the hub such that the hub rotates at a rotational speed slower than the primary input component and the secondary input component when the face splines of the secondary input component are engaged with the recesses of the primary planet gear carrier.

BRIEF DESCRIPTION OF THE DRAWINGS

The above-mentioned and other features and advantages of the present disclosure, and the manner of attaining them, will become more apparent and the invention itself will be better understood by reference to the following description of an embodiment of the invention taken in conjunction with the accompanying drawings, wherein:

FIG. 5 is an output-side, perspective, cross-sectional view of the spindle of the wheel drive shown in FIG. 2;

FIG. 6A is an input-side, perspective, cross-sectional view of the spindle shown in FIG. 5, together with the primary planetary stage components from the wheel drive of FIG. 2;

FIG. 10 is a partial cross-section, elevation view of a wheel drive made in accordance with the present disclosure attached to a vehicle frame and having a wheel attached to the wheel drive.

Corresponding reference characters indicate corresponding parts throughout the several views. The exemplifications set out herein illustrate embodiments of the disclosure and such exemplifications are not to be construed as limiting the scope of the invention in any manner.

DETAILED DESCRIPTION

Figure 1:
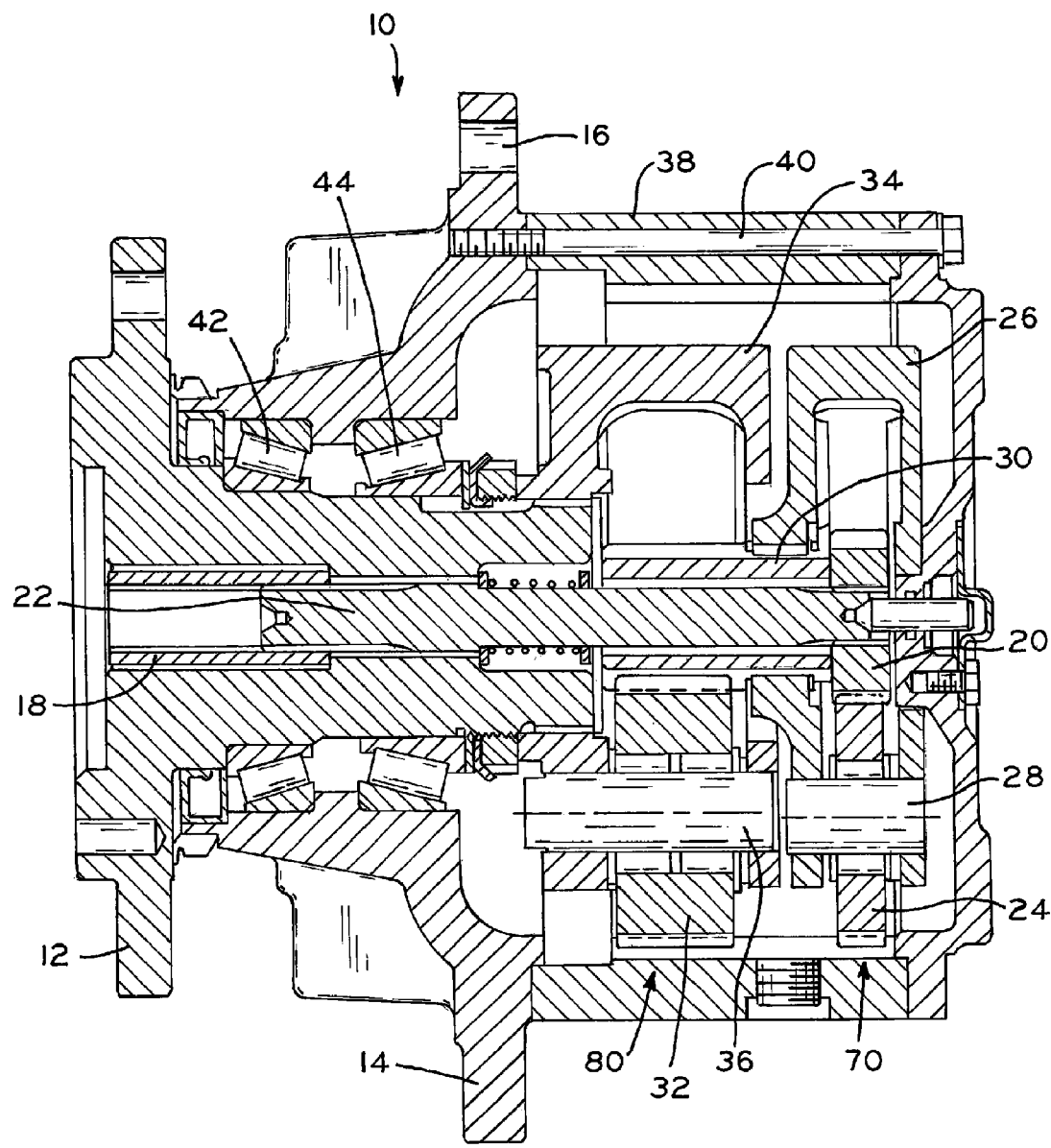
FIG. 1 is a cross-sectional, elevation view of a known wheel drive.
Figure 2:
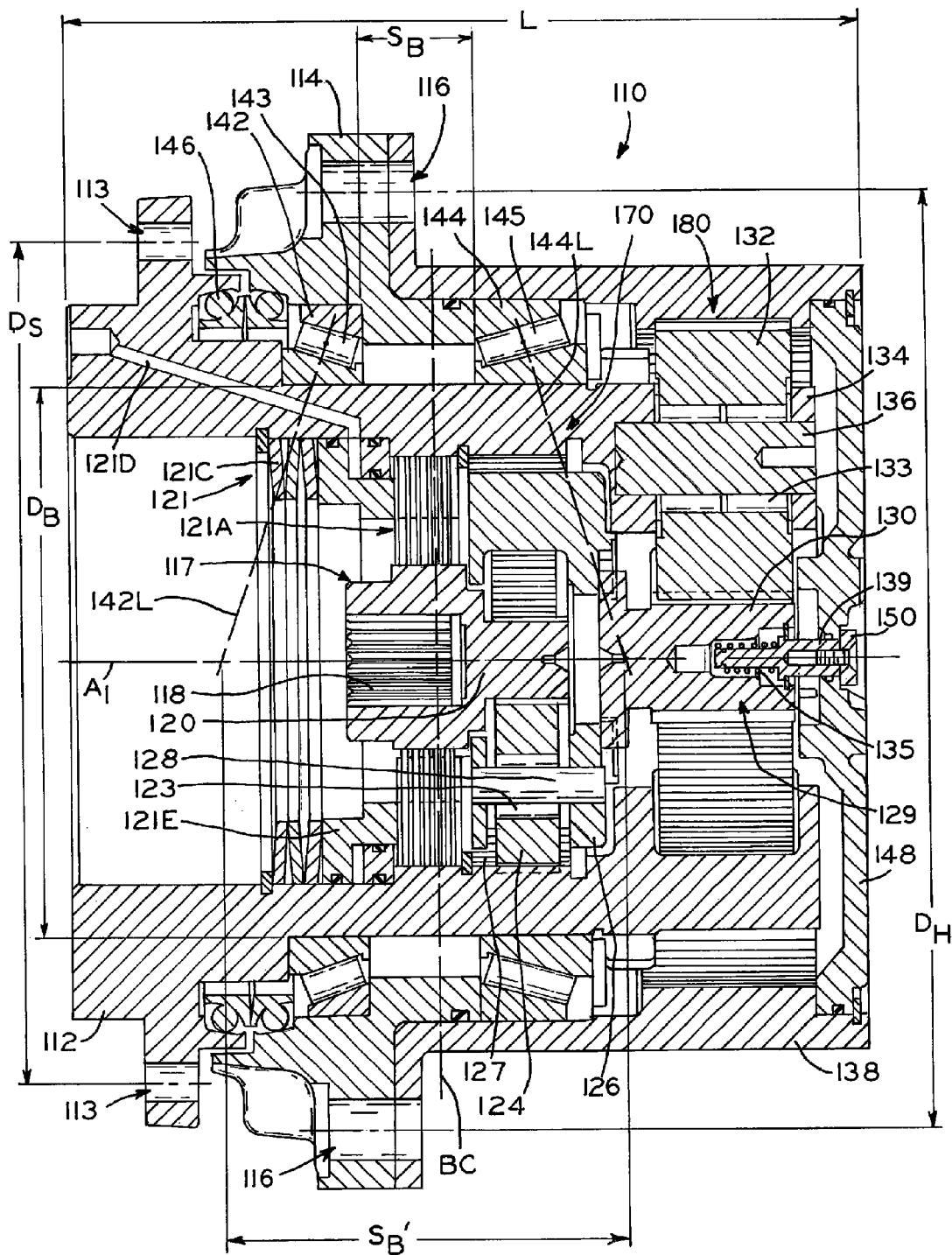
FIG. 2 is a cross-sectional, elevation view of a two-stage wheel drive made in accordance with the present disclosure.

Turning now to FIG. 2, wheel drive 110 includes a spatial arrangement of internal components which allows roller bearings 142, 144 to be spaced apart from one another such that output-side bearing 144 is disposed at an axially outward position and relatively close to the center of gravity of wheel W mounted to hub 114 (FIG. 10). As explained in detail below, this spacing of bearings 142, 144 results in a lower application of torque and stress thereupon during service, thereby enabling bearings 142, 144 to absorb heavier loads as bearings 142, 144 support the driven wheel W mounted to hub 114 and driven by ring gear 138.

In addition, the spatial arrangement of components of wheel drive 110 allows output-side bearing 144 to be disposed between hub 114 and ring gear 138, rather than between hub 114 and spindle 112. As a result, bearing 144 can utilize a larger cross-sectional area for support of driven wheel W (FIG. 10) attached to hub 114 and ring gear 138, in turn facilitating the use of a stronger, more robust bearing at the output side of wheel drive 110.

Figure 4:
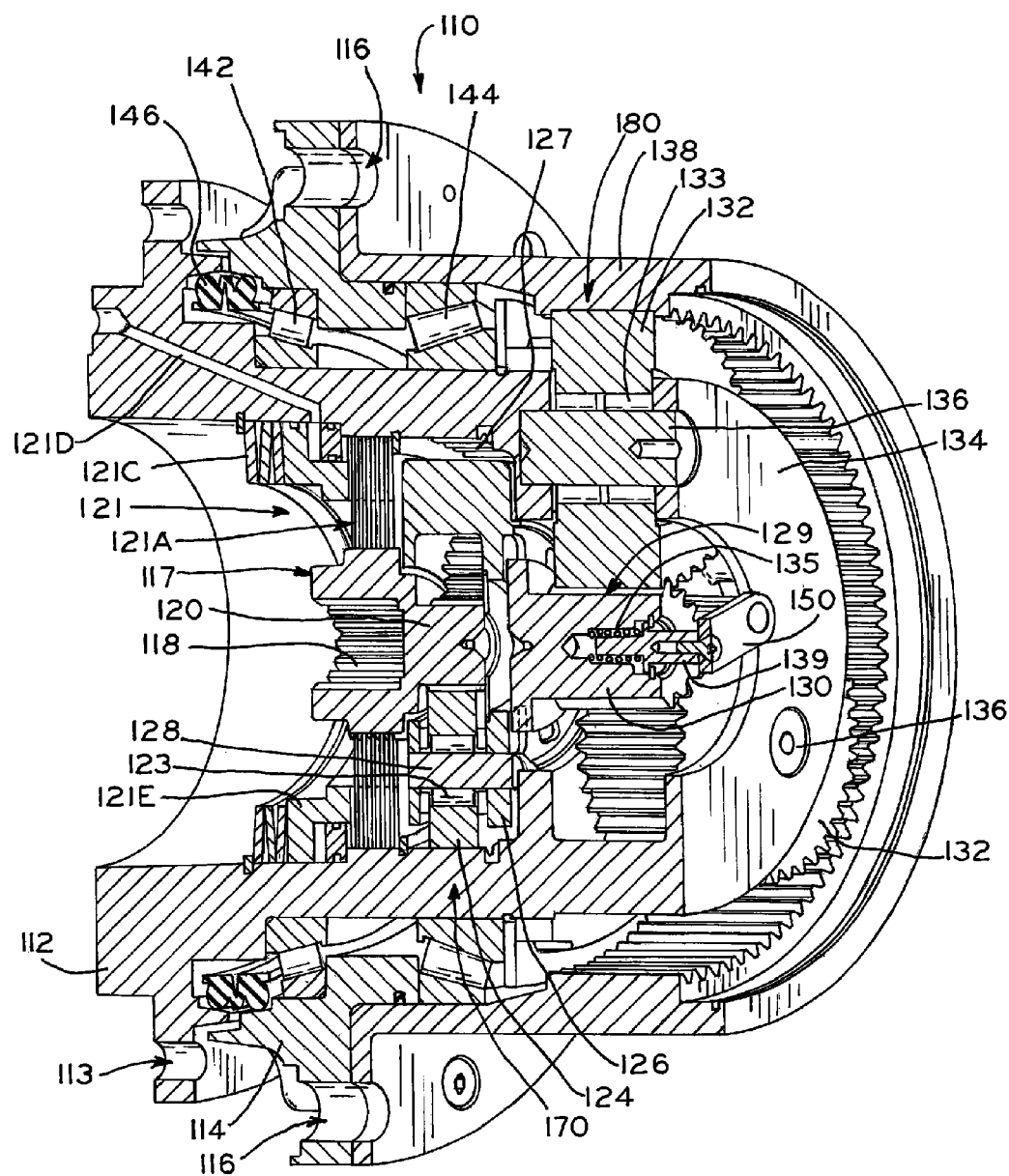
FIG. 4 is an output-side, perspective, cross-sectional view of the wheel drive shown in FIG. 2, in which the wheel drive cover has been removed for clarity.

Various components of wheel drive 110 have a generally cylindrical shape, including spindle 112, hub 114, brake system 121 and its related components, input component 117, primary gear carrier 126, bearings 142, 144, primary/secondary coupler component 129, ring gear 138, seal 146 and outer cover 148. These components define respective longitudinal axes that are coaxial with longitudinal axis $A_1$ when wheel drive 110 is assembled as shown in FIGS. 2 and 4.

1. Overview of Wheel Drive Components and Operation

Figure 3:
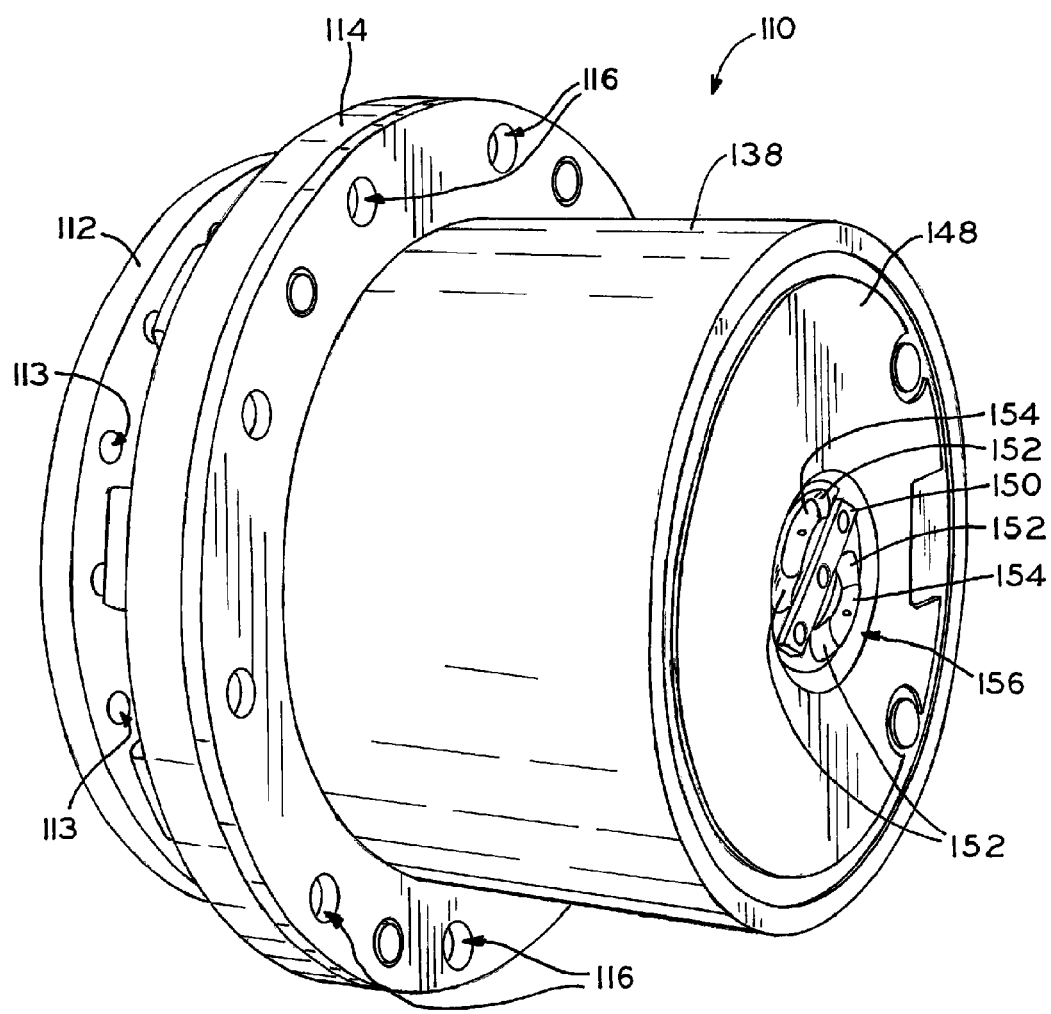
FIG. 3 is an output-side, perspective view of the wheel drive shown in FIG. 2.

As best seen in FIG. 3, wheel drive 110 includes spindle 112, which affixes to a vehicle frame F (FIG. 10) via mounting holes 113, and hub 114, which affixes to a driven wheel W via mounting holes 116 and rotates with respect to spindle 112 about longitudinal axis $A_1$ of wheel drive 110. Driven wheel W and wheel hub 114 are also affixed to ring gear 138, as described further below, such that wheel W and wheel hub 114 are powered by rotation of ring gear 138 about axis $A_1$.

Referring to FIG. 2, wheel hub 114 is rotatably mounted to spindle 112 via roller bearings 142, 144. Input-side bearing 142 is disposed between, and directly abuts the outer surface of spindle 112 and an inner surface of hub 114. Output-side bearing 144 is also mounted upon and directly abuts the outer surface of spindle 112 as illustrated, but is abutted at its radial outward surface by ring gear 138 rather than hub 114. Thus, input-side bearing 142 is both axially constrained (i.e., prevented from axial movement) and radially constrained (i.e., prevented from radially outward movement or expansion) by cooperation of adjacent surfaces of spindle 112 and hub 114. However, output-side bearing 144 is only axially constrained by spindle 112 and hub 114, while radial constraint is provided by ring gear 138. As described in further detail below, bearings 142, 144 define a wide nominal spacing $S_B$ (and an associated wide functional spacing $S_B'$) with respect to one another as measured parallel to axis $A_1$, which enhances the ability of drive 110 to absorb external loads during service.

Wheel drive 110 includes two planetary gear stages, namely primary planetary stage 170 and secondary planetary stage 180, which each contribute to the overall gear reduction between input component 117 and ring gear 138. Primary planetary stage 170 receives powered input from input component 117 and produces an intermediate output having reduced rotational speed and concomitantly higher torque as compared to input component 117. As described in further detail below, this intermediate output selectively provides the powered input to secondary planetary stage 180, by selectively rotationally fixing primary planet gear carrier 126 (which is the output component of primary stage 170) to secondary sun gear 130 (which is the input component of secondary stage 180). Secondary planet stage 180 in turn produces a final output having reduced rotational speed and increased torque with respect to the intermediate output of primary planetary stage 170. The final output is transmitted to ring gear 138, which is fixed to wheel hub 114.

Figure 9:
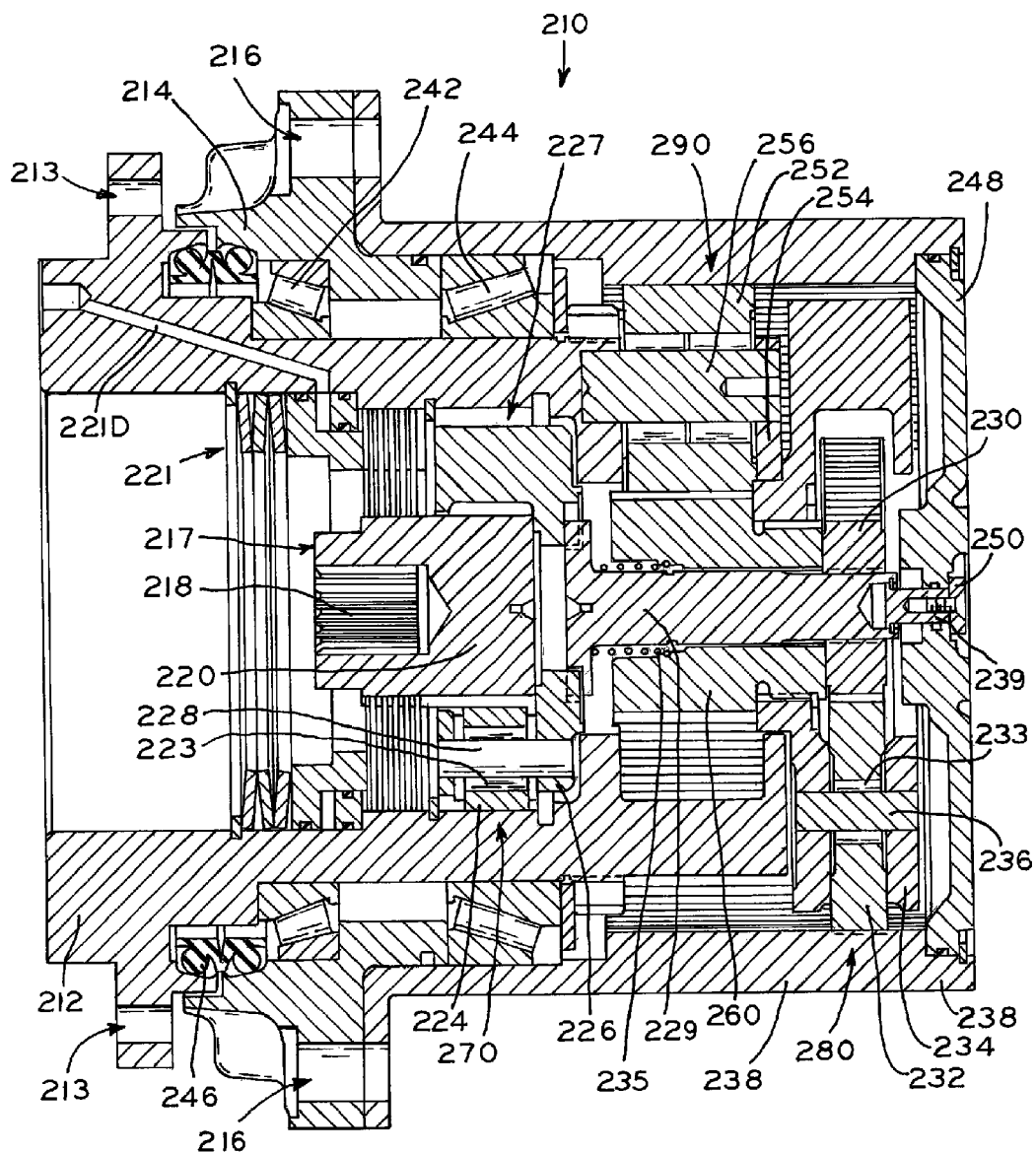
FIG. 9 is a cross-sectional, elevation view of a three-stage wheel drive made in accordance with the present disclosure.

Thus, the final output of wheel drive 110 rotates driven wheel W (FIG. 10) at a rotational speed that has been reduced twice—once by each of the two planetary stages 170, 180. This double reduction arrangement establishes wheel drive 110 as a "two stage" system, though it is contemplated that systems with other reduction mechanisms may be used. For example, a single stage wheel drive having only one planetary stage may be used in designs requiring relatively smaller overall reduction ratios, while multiple-stage wheel drives having three or more stages may be used where larger overall reduction ratios are desired. Where a single-stage wheel drive is desired, a ring gear may form the output component (as is the case with secondary stage 180 described herein), or a planet gear carrier may form the output component (as is the case with primary stage 170 described herein). A three-stage wheel drive 210 is shown in FIG. 9 and described further below.

Turning to FIGS. 2 and 4, the configuration of both primary planetary stage 170 and secondary planetary stage 180 is illustrated. First, primary planetary stage 170 receives power from input component 117 which includes input coupler 118 and sun gear 120 monolithically formed as a single part. An externally splined input shaft (not shown) transmits power from a vehicle power source to the internal splines of input coupler 118 to rotate sun gear 120. External splines formed on sun gear 120 engage correspondingly formed external splines on a plurality of planet gears 124, such as three planet gears 124 in the illustrated embodiment. Only two planet gears 124 are visible within the cross sectional views of FIGS. 2, 4 and 6A, it being understood that a lower planet gear 124 is shown in section, an upper planet gear 124 is shown behind the cross sectional plane and partially obscured by sun gear 120, and a second upper planet gear is not shown in the sectioned view. As best shown in FIG. 6, the external splines of planet gears 124 also engage ring gear 127, which is integrally formed along the inner wall of spindle 112 as further described below. Planet gears 124 are held in their respective positions by planet gear carrier 126, and are rotatable about the respective planet gear longitudinal axes via planet gear axles 128. Bearings 123 may be interposed between planet gears 124 and axles 128 to facilitate rotation therebetween.

Rotation of sun gear 120 causes planet gears 124 to rotate about planet gear axles 128, as well as to rotate about longitudinal axis $A_1$ within stationary ring gear 127. Because spindle 112 is mounted to the vehicle frame F (FIG. 10) and ring gear 127 is monolithically formed as part of spindle 112, ring gear 127 is a stationary component in the context of primary planetary stage 170 and wheel drive 110. Accordingly, planet gears 124 are free to circumnavigate sun gear 120 while rotating about axis $A_1$ and, in doing so, cause primary gear carrier 126 to rotate about axis $A_1$ at the speed of such circumnavigation. Primary gear carrier 126 is selectively rotatably fixed to sun gear 130, and therefore provides the input to drive rotation of secondary planetary stage 180, as further detailed below.

Figure 6B:
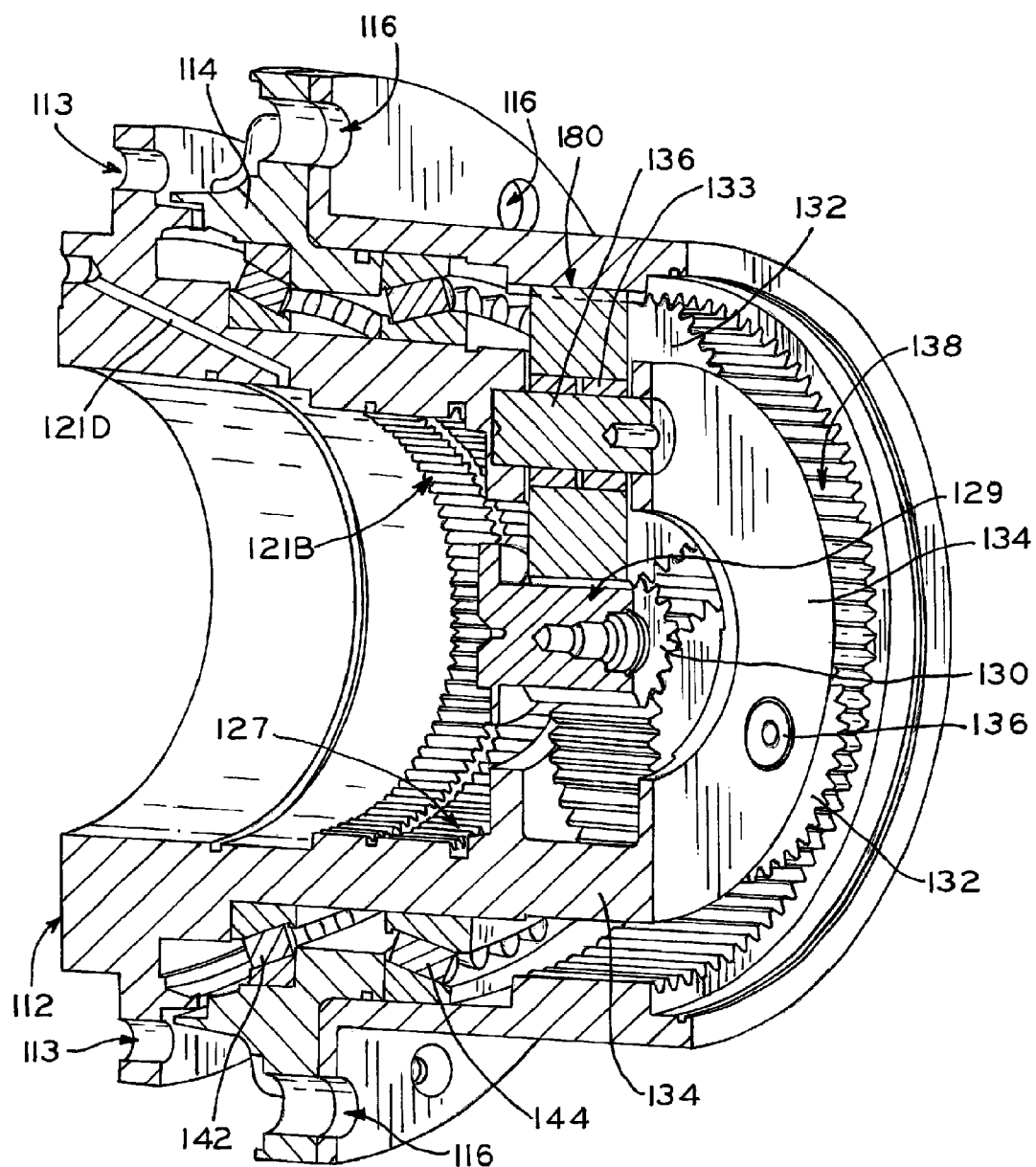
FIG. 6B is an output-side, perspective, cross-sectional view of the spindle and primary planetary stage shown in FIG. 6B, together with the secondary planetary stage and related components.

Turning to FIGS. 5 and 6B, secondary planetary stage 180 is arranged similarly to primary planetary stage 170. As described further below, however, secondary planetary stage 180 includes gear carrier 134 which is integrally and monolithically formed as a part of spindle 112, and is therefore stationary in the context of wheel drive 110. For secondary planetary stage 180, ring gear 138 is the rotatable component which serves as the output of secondary stage 180.

Similar to primary stage 170 described above, external splines of secondary sun gear 130 engage with external splines formed on each of three planet gears 132 which are in turn engaged with the internal splines formed in ring gear 138. Like primary stage 170, only two planet gears 132 are visible in the cross-sectional views of FIGS. 2, 4 and 6B, with the upper planet gear 132 shown in section and the lower planet gear 132 partially obscured by adjacent components. Rotation of secondary sun gear 130 causes planet gears 132 to rotate about planetary gear axles 136, but such rotation cannot cause circumnavigation of planet gears 132 about axis $A_1$ because planet gear carrier 134 is fixed as noted above. Instead, rotation of planet gears 132 drives rotation of ring gear 138. Thus, unlike primary stage 170 with stationary ring gear 127 and gear carrier 126 as the output component, secondary stage 180 utilizes ring gear 138 as its output component while gear carrier 134 remains stationary. Bearings 133 may be interposed between planet gears 132 and axles 136 to facilitate rotation therebetween.

Spindle 112 therefore serves multiple roles in wheel drive 110, including the role of a stationary component in each of the planetary stages 170, 180 (i.e., ring gear 127 and planet gear carrier 134 respectively). For clarity, FIG. 5 illustrates spindle 112 in cross-section without other components, while FIGS. 6A and 6B show spindle 112 with only primary and secondary planetary stages 170, 180 respectively.

As most clearly illustrated in FIGS. 5 and 6A, stationary ring gear 127 is integrally formed in spindle 112 for interaction with the other components of primary planetary stage 170. Unlike spindle 12 of wheel drive 10, spindle 112 of wheel drive 110 encircles primary planetary stage 170. FIGS. 5 and 6B illustrate that gear carrier 134 as an integrally, monolithically formed part of spindle 112, with gear carrier 134 receiving planetary gear axles 136 through axle apertures 137 (FIG. 5). In short, spindle 112 serves as both a housing and a support structure for both planetary stages 170, 180, with primary planetary stage 170 axially rotating within the cavity of spindle 112 and secondary planet gears 132 rotating about gear axles 136 received within apertures 137 formed in spindle 112 (FIG. 5). As described in further detail below, this arrangement of components moves primary planetary stage 170 into spindle 112 such that the space radially outside of spindle 112 normally occupied by primary stage 170 is made available, which in turn allows output-side bearing 144 to occupy the space normally occupied by primary stage 170.

Wheel drive 110 may be used outside, and may therefore be exposed to the elements. Wheel drive 110 includes seal 146, best shown in FIG. 2, disposed between hub 114 and spindle 112. Referring to FIGS. 2 and 3, outer cover 148 is fitted on the axial outward end of ring gear 138. Seal 146 and outer cover 148 cooperate to retain lubricant contained within wheel drive 110, while also preventing dust, moisture, and other contaminants from infiltrating the interior of wheel drive 110.

As best seen in FIG. 2, wheel drive 110 optionally includes brake system 121 operable to selectively arrest rotation of input component 117. Clutch pack 121A includes alternating clutch plates engaging inner splines 121B (FIG. 5) formed on the inner surface of spindle 112 or outer splines formed on coupler portion 118 of input component 117. Springs 121C, which may be provided as Belleville-type springs, urge clutch release component 121E into engagement with clutch pack 121A, biasing the alternating clutch plates into abutting engagement with one another. This creates frictional resistance to rotation of input component 117. Hydraulic line 121D selectively provides pressurized fluid to move clutch release component 121E axially toward the input side of wheel drive 110, against the biasing force of springs 121C. This allows the clutch plates of clutch pack 121A to spread apart from one another, relieving the friction therebetween and allowing input component 117 to rotate.

2. Bearing Spacing

As noted above and shown in FIG. 2, the arrangement of the components disclosed in the present wheel drive allows bearings 142, 144 to be spaced from one another by a large spacing distance $S_B$, which in turn results in a large load spacing $S_B'$. Spacing distance $S_B$ is the axial extent of the space between bearings 142, 144, i.e., the shortest distance between the respective outer surfaces of bearings 142, 144. Load spacing $S_B'$ is the axial extent between intersection points between longitudinal axis $A_1$ and bearing load lines 142L, 144L respectively. Load lines 142L, 144L extend perpendicularly to the longitudinal axes defined by bearing rollers 143, 145, respectively, and originate halfway along the axial extent of rollers 143, 145, respectively. Load lines 142L, 144L extend radially inwardly to the respective intersection points with axis $A_1$. Thus, load spacing $S_B'$ can be made larger by canting bearing rollers 143, 145, further out of parallel relationship with axis $A_1$, and smaller by canting bearing rollers 143, 145 toward a parallel orientation with respect to axis $A_1$. Such canting affects the ability of bearings 142, 144 to absorb forces and stresses without damage, with larger load spacing $S_B'$ associated with increased ability to absorb bending moments but decreased ability to absorb radial forces. An increase in spacing distance $S_B$ results in a corresponding increase in load spacing $S_B'$ for any given arrangement of rollers 143, 145, while also preserving the full radial capabilities of the roller arrangement. This, in turn, facilitates greater ability for bearings 142, 144 to absorb the chaotic forces and stresses which may be exerted when used on a vehicle.

Spacing distance $S_B$ also cooperates with the respective sizes of bearings 142, 144 to define functional bearing center line BC. Center line BC is axially positioned such that, when a radial force is applied to bearings 142, 144 over time, bearings 142, 144 can be expected to wear at an even rate. Thus, if bearings 142, 144 shared equal load ratings (and usually, equal cross-sectional sizes), center line BC would be halfway between bearings 142, 144 (i.e., oriented at one-half of distance $S_B$).

However, as shown in the exemplary embodiment of FIGS. 2 and 4, bearings 142, 144 have differing load ratings. Output-side bearing 144 is disposed between the outer wall of spindle 112 and the inner wall of ring gear 138, which is a relatively larger radial and axial space such that output-side bearing 144 has a larger overall cross-section compared to input-side bearing 142, which is disposed in the relatively smaller space between the outer wall of spindle 112 and the inner wall of hub 114. The larger cross-section of output-side bearing 144 enables utilization of a higher load rating with respect to input-side bearing 142. Thus, center line BC is biased toward the bearing with a higher load rating as illustrated in FIG. 2. The amount of such biasing is proportional to the relative strengths of the bearings, i.e., if bearing 144 has a load rating twice that of bearing 142, center line SB is twice as far from bearing 142 as it is from bearing 144.

Output-side bearing 144 is axially spaced from mounting holes 116 of output hub 114 toward the output side of wheel drive 110, such that output-side bearing 144 is positioned within the axial extent of wheel W (i.e., the distance along the axis of wheel rotation from the outboard-most point of wheel W to the inboard-most point thereof, as shown in FIG. 10). This positioning is enabled by the placement of primary planetary stage 170 within spindle 112, which in turn allows output-side bearing 144 to be placed at a common axial position with primary stage 170 as illustrated in FIGS. 2 and 4. Moreover, this common axial position is such that the axial extent of bearing 144 is substantially subsumed by the axial extent of primary stage 170.

In addition, the position and relative load ratings of bearings 142, 144 dispose the functional bearing center line BC also within the axial extent of wheel W. Load spacing $S_B/S_B'$ and the positioning of bearings 142, 144 cooperate to minimize stresses exerted on bearings 142, 144 during operation of wheel drive 110, as described in detail below.

In exemplary embodiments of wheel drives 110 used on vehicle hubs, spacing distance $S_B$ may be as little as 0.419 inches, 0.75 inches or 1 inch, and as large as 1.5 inches, 1.75 inches, or 2.00 inches, or may be any distance within any range defined by any of the foregoing values. For exemplary bearings 142, 144, this results in load spacing distance $S_B'$ that is as small as 2.5 inches, 3.0 inches or 3.5 inches, and as large as 4.5 inches, 5.0 inches, or 5.5 inches, or may be any distance within any range defined by any of the foregoing values.

Each bearing 142, 144 defines bore diameter $D_B$ sized to fittingly encircle spindle 112. Diameter $D_B$ of bearings 142, 144 is slightly larger than the outer diameter of spindle 112, such that bearings 142, 144 slide easily over the outer surface of spindle 112. In exemplary embodiments of wheel drives 110 used on vehicle hubs, diameter $D_B$ may be as small as 2.0 inches, 3.0 inches or 4.0 inches, and as large as 6.0 inches, 7.0 inches, or 8.0 inches, or may have any bore size within any range defined by any of the foregoing values.

The present arrangement of components within wheel drive 110 facilitates the bearing spacing $S_B$ between bearings 142, 144, which in turn shortens the axial distance between the most axial outward point of the assembly (i.e., the approximate location of the wheel center of gravity of driven wheel W as shown in FIG. 10) and output-side bearing 144/center line BC. In other words, output-side bearing 144 and center line BC are placed closer to the point of load application upon wheel W attached to hub 114, which in turn reduces the bending torque and minimizes the stresses on bearings 142, 144.

Increasing the distance between the two bearings 142, 144 and thus decreasing the distance between center line BC and the center of gravity of wheel W is an effective way to decrease the stresses on the bearings 142, 144 while maintaining the other dimensions of wheel drive 110 according to industry standards and/or application demands. For some wheel drive designs, the overall size and configuration of wheel drive 110 are imposed as design constraints because wheel drive 110 must be compatible with existing vehicle frame mounting geometry and/or existing available vehicle wheels. For example, referring to FIG. 2, spindle 112 includes mounting holes 113 arranged annularly around a spindle bolt circle having diameter $D_S$, while hub 114 and ring gear 138 similarly include mounting holes 116 arranged annularly around a hub bolt circle having diameter $D_H$. For the exemplary embodiments noted above, diameters $D_H$ and $D_S$ are between 6.5 inches and 17.0 inches. In addition, wheel drive 110 defines overall axial length L, which in the exemplary embodiments noted above is between 7.5 inches and 15.0 inches.

The present wheel drive arrangement increases spacing $S_B$ without making any other changes to overall size and configuration of wheel drive 110, including bolt circle diameters $D_H$ and $D_S$ and overall axial length L, such that wheel drive 110 provides greater strength and capacity for bearings 142, 144 while maintaining the ability to fit wheel drive 110 into existing vehicle infrastructure.

Thus, wheel drives 110 can be provided in a wide range of overall sizes. Some very small sizes may be provided for passenger vehicle applications, such as pickup trucks and other off-road applications, while very large sizes may be provided for earth moving equipment, large construction vehicle, and the like. Generally speaking, the nominal spacing $S_B$ of bearings 142, 144 increases as the other components increase in size. Accordingly, one way to express the present wide bearing spacing in the context of a wide range of wheel drive sizes is as a ratio of spacing $S_B'$ and/or spacing $S_B$ to bearing bore diameter $D_B$. A higher $S_B:D_B$ ratio or $S_B':D_B$ ratio is indicative of a relatively greater relative spacing between bearings 142, 144, and is also indicative of the output-side bearing 144 and center line BC being closer to the center of gravity of driven wheel W (FIG. 10). Accordingly, a greater $S_B:D_B$ ratio or $S_B':D_B$ ratio generally results in higher bearing support capability for a given wheel drive size. In an exemplary design, for example, the $S_B:D_B$ ratio may be between 0.11 and 0.50, which results in a stronger and more robust wheel drive 110 as compared to existing designs. In this exemplary arrangement, the $S_B':D_B$ ratio may be between 0.690 and 1.090.

Another feature of wheel drive 110 indicative of wide spacing $S_B$ is the positioning of output side bearing 144 and center line BC relative to mounting holes 116 for driven wheel W at hub 114 and ring gear 138. As best illustrated in FIG. 2, bearing 144 is disposed axially outward relative to mounting holes 116, thereby placing bearing 144 and bearing load center line BC within the axial extent of driven wheel W when wheel W is mounted to wheel drive 110 (as shown in FIG. 10). More particularly, ring gear 138 and cover 148 are both contained within the generally cylindrical cavity C created by wheel W on a typical installation, such that ring gear 138 is directly radially inward of the contact patch P between tire T and the adjacent ground G. Stated another way, a line taken from the center of contact patch P and perpendicular to ground G intersects ring gear 138. The placing of bearing 144 axially outward of mounting holes 116 disposes bearing 144 within the axial extent of wheel W, thereby minimizing or eliminating the axial spacing between the application of force to wheel W and center line BC. This, in turn, minimizes or eliminates the lever arm which would result in a torque being placed upon bearings 142, 144, such that bearings 142, 144 need only handle the radial inward force applied by wheel W rather than such force together with a resultant torque.

3. Short-Stroke Disconnect Mechanism

Figure 7:
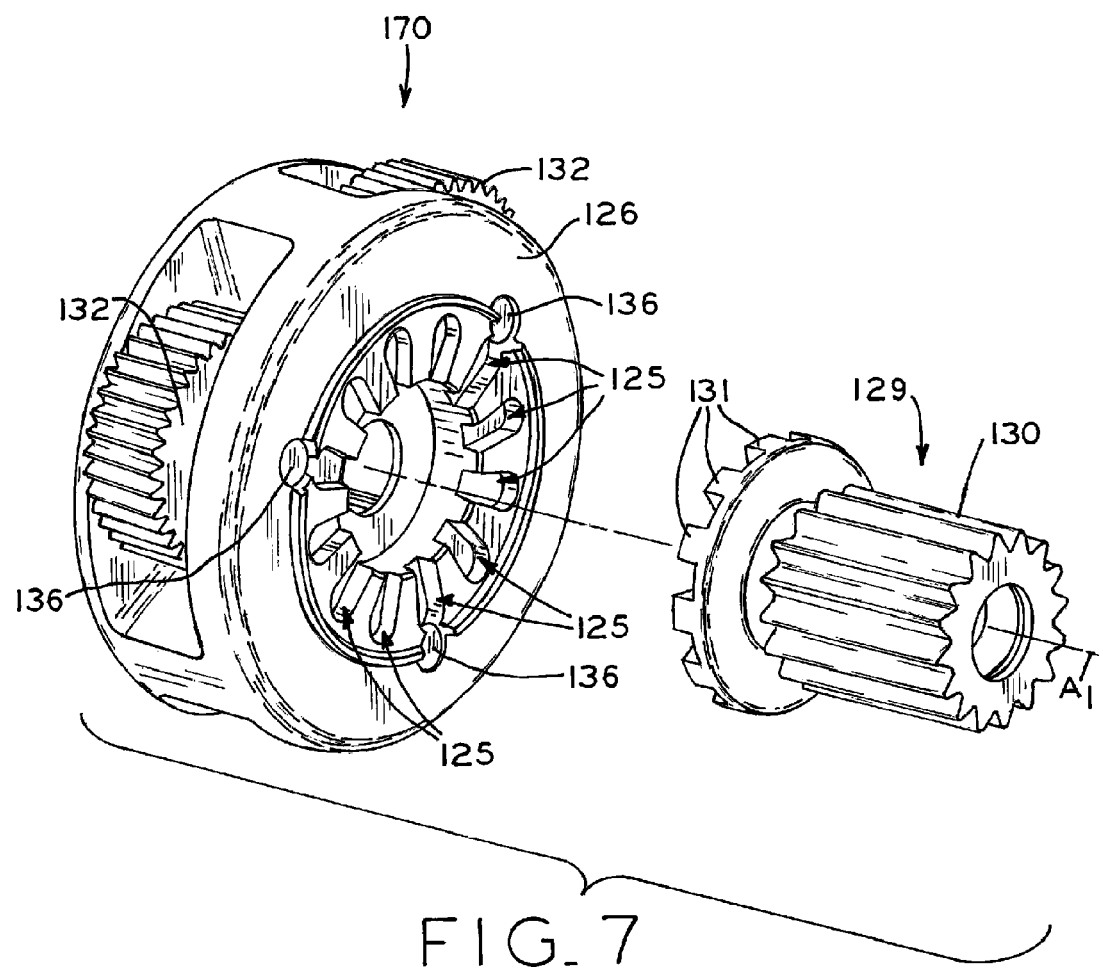
FIG. 7 is a perspective, cross-sectional view of the primary planetary stage components and the secondary sun gear shown in FIG. 2, shown with the sun gear's splines withdrawn from corresponding recesses in the primary gear carrier.
Figure 8A:
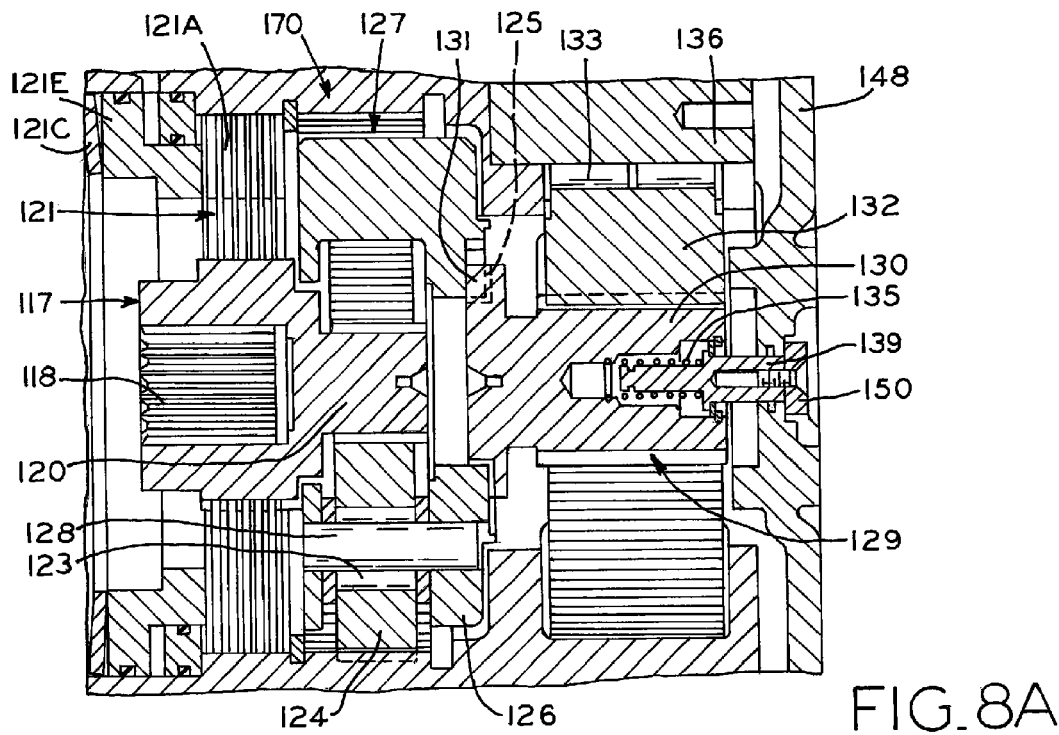
FIG. 8A is a cross-sectional, partial elevation view of the wheel drive shown in FIG. 2, illustrating the short-stroke disconnect mechanism in an engaged configuration.
Figure 8B:
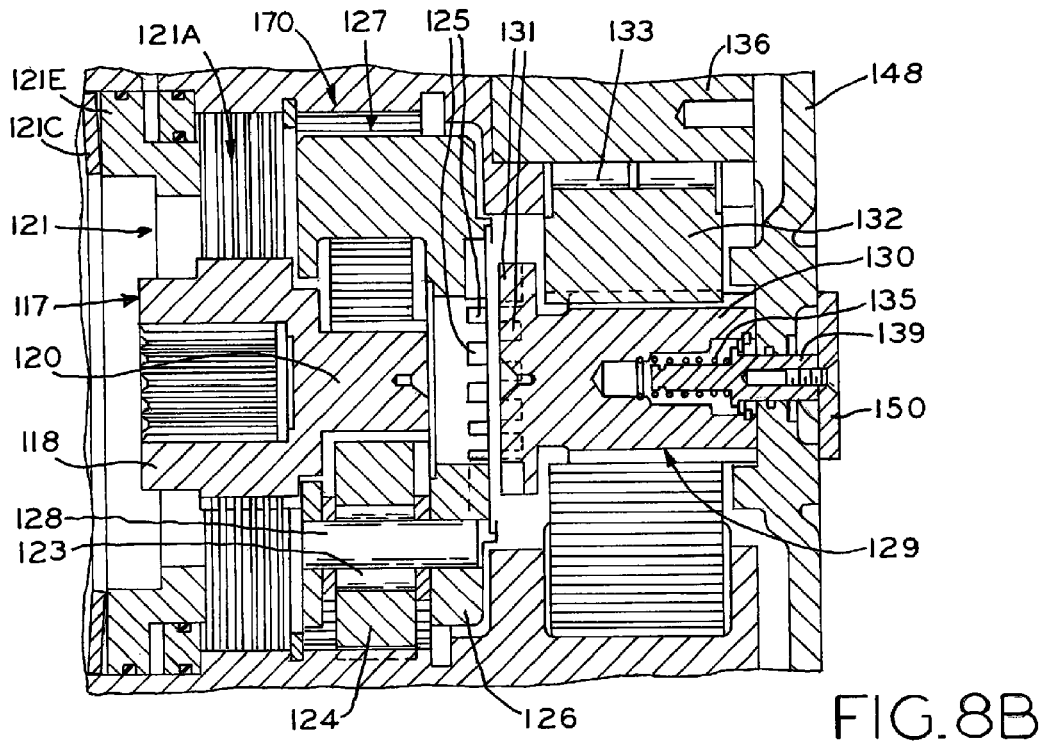
FIG. 8B is a cross-sectional, partial elevation view of the wheel drive shown in FIG. 2, illustrating the short-stroke disconnect mechanism in a disengaged configuration.
Figure 8C:
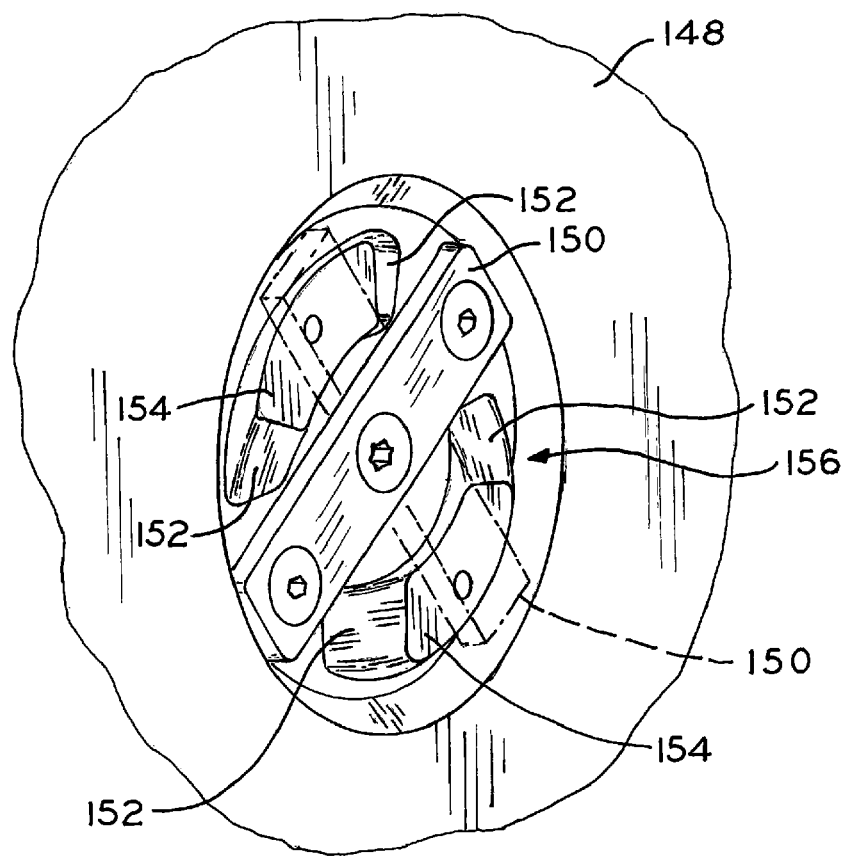
FIG. 8C is a cross-sectional, partial perspective view of the wheel drive shown in FIG. 3, illustrating a user interface for the short-stroke disconnect mechanism shown in FIGS. 8A and 8B.

FIGS. 7-8C illustrate short-stroke disconnect mechanism that can be used to disengage sun gear 130 of secondary planetary stage 180 from planet gear carrier 126 of primary stage 170, thereby allowing wheel hub 114 and wheel W to disengage from the influence of the vehicle power source. When so disengaged, the attached wheel W can spin freely with respect to spindle 112, such as for towing the vehicle. Referring to FIG. 8, the present arrangement utilizes primary/secondary coupler component 129 which facilitates a short disengagement stroke by utilizing face splines 131 protruding axially away from sun gear portion 130. Face splines 131 selectively engage corresponding recesses 125 formed in an axial end surface of primary planet gear carrier 126 to rotationally fix primary stage 170 to secondary stage 180, as further detailed below.

In an exemplary embodiment, sun gear portion 130 and face splines 131 are monolithically formed as a single piece, namely, primary/secondary coupler component 129. Similarly, recesses 125 are monolithically formed as a part of primary planet gear carrier 126. This monolithic construction contributes to long life and high strength of the short-stroke disconnection mechanism, as well as minimizing rotational backlash through the system when short-stroke disconnection mechanism is subjected to forces and torques. Moreover, as illustrated in FIGS. 8A and 8B, a minimal amount of internal volume is consumed by structures dedicated to the disconnection functionality of the short-stroke disconnection mechanism, because the bulk of primary/secondary coupler component 129 and primary planet gear carrier 126 are already present serving other functions within wheel drive 110 as described in detail above.

FIGS. 8A-8B illustrate the transition from engagement to disengagement of the short-stroke disconnection mechanism. In FIG. 8A, the mechanism is shown in the actuated configuration, in which face splines 131 are received within recesses 125. When so received, primary/secondary coupler component 129 is rotationally fixed to primary planet gear carrier 126, such that torque output from primary planetary stage 170 is input into secondary planetary stage 180 as described above. Component 129 is maintained in this engaged position by spring 135, which is compressed between an internal bore formed in sun gear portion 130 and spring plunger 139, which is fixed to lever 150 as detailed below.

FIG. 8B shows face splines 131 of sun gear 130 withdrawn from engagement with corresponding recesses 125. As described below, this withdrawn engagement is effected by rotating lever 150 to axially displace primary/secondary coupler component 129 against the biasing force of spring 135 such that face splines 131 move axially toward the output side of wheel drive 110, thereby withdrawing splines 131 axially out of recesses 125. When so withdrawn, any torque imparted to gear carrier 126 from input component 117 will no longer input into the secondary planetary stage 180, such that ring gear 138 is effectively decoupled from the vehicle power source and will not be driven by input from input component 117.

The present short-stroke withdrawal mechanism allows wheel drive 110 to be reconfigured between the engaged position of FIG. 8A, in which hub 114 and ring gear 138 are driven by input component 117, and the disengaged position of FIG. 8B, in which the input component 117 is functionally decoupled from hub 114 and ring gear 138 (such that the vehicle using wheel drive 110 can be towed or pushed without interference from the braking system 121, vehicle engine or transmission as noted above). In addition, decoupling ring gear 138 from the power source avoids rotation of the components of primary planetary stage 170 during rotation of wheel W (FIG. 10), thereby preventing wear of such components when wheel W is rotating and wheel drive 110 is not being powered by input component 117.

As noted above, the short-stroke disconnect mechanism is toggled between the engaged and disengaged configurations by rotating lever 150. Referring to FIG. 8C, such rotation results in axial displacement of lever 150 which in turn axially displaces primary/secondary coupler component 129 with respect to primary planet gear carrier 126 (FIGS. 8A and 8B). More particularly, FIG. 8C illustrates the center portion of wheel drive cover 148, which includes cam surfaces 152 and lands 154 within recess 156. When lever 150 is rotated from the engaged position (shown in solid lines of FIG. 8C) and the disengage position (shown in dashed lines), lever 150 engages cam surfaces 152 which urges lever 150 axially outwardly. As this axial outward travel occurs, spring plunger 139 (which is axially fixed to lever 150) is drawn outwardly, carrying primary/secondary coupler component 129 with it. This compresses spring 135, and simultaneously withdraws face splines 131 out of engagement with the corresponding recesses 125 formed in primary planet gear carrier 126. Resting lever 150 upon lands 154 maintains the disconnect mechanism in the disengaged state, and rotating lever 150 back down cam surfaces 152 allow spring 135 to bias lever 150, spring plunger 139 and primary/secondary coupler component 129 back in to the engaged state.

4. Multiple-Stage Planetary Systems

Wheel drive 110 utilizes primary and secondary planetary stages 170, 180 to achieve a final reduced speed and increased torque of ring gear 138 with respect to input component 117, as described above. However, it is also contemplated that other arrangements having fewer or more planetary stages can be used, such as three-stage wheel drive 210 shown in FIG. 9. This arrangement includes primary stage 270 contained within spindle 212, secondary planetary stage 280 disposed at the axial outward end of wheel drive 210 and operably connected to primary stage 270 via secondary sun gear 230, and tertiary stage 290 operably connected to secondary stage 280 via tertiary sun gear 260. Secondary and tertiary stages 280 and 290 cooperate to drive ring gear 238.

Except as otherwise noted herein, reference numbers used to refer to components of wheel drive 110 are correspondingly used in reference to wheel drive 210, except with 100 added thereto.

Primary planetary stage 270 is functionally identical to primary planetary stage 170, except that sun gear 220 is larger than sun gear 120 and planet gears 224 are concomitantly smaller than planet gears 124. It is, of course, contemplated that primary planetary stage 170 of wheel drive 110 could be identical to primary planetary stage 270. Moreover, any arrangement of planetary components may be used to provide a desired gear reduction as required or desired for a particular design.

Secondary planetary stage 280 is arranged as the output-side planetary stage, i.e., closest to the outboard side of the wheel (FIG. 10), and is disposed axially outside of spindle 212. Secondary stage 280 receives power from primary planet gear carrier 226, via primary/secondary coupler component 229 in similar fashion to wheel drive 110 described above, except that secondary sun gear 230 is a separate component rotatably fixed to coupler component 229 rather than being integrally formed therewith.

Secondary sun gear 230 includes outer splines with engage correspondingly formed outer splines of three planet gears 232, causing planet gears 232 to rotate about planet gear axles 236 within ring gear 238. Similar to FIG. 2 illustrating wheel drive 110, FIG. 9 shows only two planet gears 232 in the cross-sectional view, with the lower gear 232 shown in section and the upper gear 232 partially obscured by adjacent components. However, unlike the primary stage having stationary ring gear 227 formed along the inner wall of spindle 212, ring gear 238 of secondary stage 280 rotates as a result of the rotation of internal planet gears 232. Further, gear carrier 234 of secondary planetary stage 280 rotates as a result of the rotation of internal planet gears 232 in addition to ring gear 238. Thus, secondary planetary stage 280 has both a rotating ring gear 238 and a rotating gear carrier 234. Gear carrier 234 is rotatably fixed to sun gear 260 of tertiary planetary stage 290 and rotates sun gear 260.

Splines formed on the outer surface of tertiary sun gear 260 engage correspondingly formed external splines on the three planet gears 252, which are in turn supported by and rotate about gear axles 256 in gear carrier 254. Tertiary gear carrier 254 is integrally formed as part of spindle 212, and is therefore stationary in the context of wheel drive 210. Tertiary planet gears 252 rotate about gear axles 256 while engaging the internal splines of ring gear 238 to aid in rotation of ring gear 238. Accordingly, planet gears 232 and 252 of both secondary and tertiary planetary stages 270, 280 cooperate to drive ring gear 238, with secondary planet gears 232 allowed to circumnavigate secondary sun gear 230 while tertiary planet gears 252 do not circumnavigate.

As with wheel drive 110, rotation of ring gear 238 forms the final output of wheel drive 210, and rotates wheel W at a rotational speed that has been reduced three times once by each of the three planetary stages 270, 280, and 290.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A wheel drive transmission unit comprising:
a spindle defining a longitudinal spindle axis, said spindle configured to affix to a vehicle frame at an input side of the transmission unit;
a hub defining a longitudinal hub axis, said hub rotatable with respect to said spindle about said longitudinal hub axis and configured to affix to a driven wheel at an output side of the transmission unit, said hub having a first terminal axial output end surface facing away from the input side of the transmission unit;
a planetary stage functionally interposed between said spindle and said hub, said planetary stage comprising:
an input component positioned and configured to receive power from a vehicle power source;
a plurality of planet gears in meshing engagement with said input component;
a planet gear carrier rotatably attached to each of said plurality of planet gears; and
a ring gear in meshing engagement with each of said plurality of planet gears, said ring gear having a second terminal axial output end surface facing away from the input side of the transmission unit,
one of said planet gear carrier and said ring gear comprising a output component operably coupled to said hub such that said hub rotates at a rotational speed slower than said input component when said input component receives power;
an input-side bearing mounted to an outer wall of said spindle and occupying a first space radially between said outer wall of said spindle and an inner wall of said hub, such that said input-side bearing rotatably supports said hub; and
an output-side bearing mounted to said outer wall of said spindle at a location spaced axially from said input-side bearing by a bearing spacing distance, said output-side bearing occupying a second space radially between said outer wall of said spindle and an inner wall of said ring gear and axially between said first and second terminal axial output end surfaces of said hub and said ring gear respectively,
said second space larger than said first space whereby said output-side bearing has a larger overall cross-section as compared to said input-side bearing.

2. The wheel drive transmission unit of claim 1 wherein:
said planetary stage comprises a secondary planetary stage such that said input component comprises a secondary input component, said plurality of planet gears comprises a secondary plurality of planet gears, said planet gear carrier comprises a secondary planet gear carrier, and said ring gear comprises a secondary ring gear,
said wheel drive transmission further including a primary planetary stage comprising:
a primary input component positioned and configured to receive power from said vehicle power source;
a plurality of primary planet gears in meshing engagement with said primary input component;
a primary planet gear carrier rotatably attached to each of said plurality of primary planet gears; and
a primary ring gear in meshing engagement with each of said plurality of primary planet gears, said primary planet gear carrier comprising a primary output component operably affixed to said secondary input component such that said secondary planetary stage receives power from said vehicle power source via said primary planetary stage,
said secondary ring gear comprising a secondary output operably affixed to said hub such that said hub rotates at a rotational speed slower than said primary output component when said primary input component receives power,
whereby said primary and secondary planetary stages cooperate to reduce a rotational speed of said hub with respect to said primary input component.

3. The wheel drive transmission unit of claim 2, wherein said primary planetary stage is contained within said spindle radially inwardly of said output-side bearing, such that said primary planetary stage and said output-side bearing share a common axial position.

4. The wheel drive transmission unit of claim 3, wherein said primary ring gear is integrally, monolithically formed as part of said spindle, whereby said primary ring gear is fixed and said primary planet gear carrier comprises said primary output component.

5. The wheel drive transmission unit of claim 2, wherein said primary ring gear and said secondary planet gear carrier are integrally, monolithically formed as part of said spindle, whereby said primary ring gear is fixed such that said primary planet gear carrier comprises said primary output component, and said secondary planet gear carrier is fixed such that said secondary ring gear comprises said secondary output component.

6. The wheel drive transmission unit of claim 2, wherein said primary planetary stage defines a primary stage axial extent within the wheel drive transmission, said output-side bearing disposed radially outside of said primary planetary stage and occupying an output-side bearing axial extent overlapping said primary stage axial extent.

7. The wheel drive transmission unit of claim 1, wherein said planetary stage comprises a primary planetary stage such that said input component comprises a primary input component, said plurality of planet gears comprises a primary plurality of planet gears, said ring gear comprises a primary ring gear, and said planet gear carrier comprises a primary planet gear carrier which is also a primary output component, the wheel drive transmission unit further comprising:
a secondary planetary stage comprising:
a secondary input component positioned and configured to receive power from said primary output component of said primary planetary stage;
a plurality of secondary planet gears in meshing engagement with said secondary input component; and
a secondary planet gear carrier rotatably attached to each of said plurality of secondary planet gears, said secondary planet gear carrier comprising a secondary output component;
a secondary ring gear in meshing engagement with each of said plurality of secondary planet gears, and
tertiary planetary stage comprising:

a tertiary sun gear comprising a tertiary input component positioned and configured to receive power from said secondary output component of said secondary planetary stage;
a plurality of tertiary planet gears in meshing engagement with said tertiary input component; and
a tertiary planet gear carrier rotatably attached to each of said plurality of tertiary planet gears;
said secondary ring gear acted upon by said plurality of tertiary planet gears, whereby said secondary planetary stage and said tertiary planetary stage cooperate to rotate said secondary ring gear at a rotational speed slower than said secondary output component when said primary input component receives power.

8. The wheel drive transmission unit of claim 1, further comprising a brake system functionally interposed between said spindle and said input component, said brake system operable to selectively rotationally fix said input component to said spindle.

9. The wheel drive transmission unit of claim 1 wherein said wheel drive transmission unit comprises an overall axial length between 7.5 inches and 15.0 inches.

10. The wheel drive transmission unit of claim 1 wherein said hub and said spindle each comprise a plurality of mounting holes annularly arranged about a hub bolt circle and a spindle bolt circle, respectively, said hub bolt circle and said spindle bolt circle each defining diameters between 6.5 inches and 17.0 inches.

11. The wheel drive transmission unit of claim 1, wherein said input-side bearing and said output-side bearing are arranged such that a ratio of said bearing spacing distance to a bore diameter of said output-side bearing is at least 0.11.

12. The wheel drive transmission unit of claim 1, wherein said hub is configured to affix to the driven wheel via a plurality of annularly arranged hub mounting holes, said output-side bearing axially positioned further toward the output side of the transmission unit as compared to said hub mounting holes, whereby said output-side bearing is positioned to rotatably support the driven wheel affixed to said hub from a position within an axial extent of the driven wheel.

13. The wheel drive transmission unit of claim 1, wherein said hub axially constrains said output-side bearing against movement along said outer wall of said spindle, while said inner wall of said ring gear radially constrains said output-side bearing.

14. The wheel drive transmission unit of claim 1, wherein said output-side bearing directly abuts said outer wall of said spindle, and said output-side bearing directly abuts said inner wall of said ring gear.

15. The wheel drive transmission unit of claim 1 wherein said output-side bearing abuts said outer wall of said spindle and said inner wall of said ring gear.

16. A wheel drive transmission unit comprising:
a spindle defining a longitudinal spindle axis, said spindle configured to affix to a vehicle frame at an input side of the transmission unit;
a hub defining a longitudinal hub axis, said hub rotatable with respect to said spindle about said longitudinal hub axis and configured to affix to a driven wheel at an output side of the transmission unit;
a primary planetary stage functionally interposed between said spindle and said hub, said primary planetary stage comprising:
a primary input component positioned and configured to receive power from a vehicle power source;
a plurality of primary planet gears in meshing engagement with said primary input component;
a primary planet gear carrier rotatably attached to each of said plurality of primary planet gears; and
a primary ring gear monolithically formed as part of said spindle as a single one-piece structure, said primary ring gear in meshing engagement with each of said plurality of primary planet gears, such that said primary input component, said plurality of primary planet gears and said primary planet gear carrier are disposed radially inwardly of said primary ring gear formed in said spindle;
a secondary planetary stage functionally interposed between said spindle and said hub, said secondary planetary stage comprising:
a secondary input component positioned and configured to receive power from said primary planet gear carrier of said primary planetary stage;
a plurality of secondary planet gears in meshing engagement with said secondary input component;
a secondary planet gear carrier rotatably attached to each of said plurality of secondary planet gears, said secondary planet gear carrier monolithically formed as part of said spindle as a single one-piece structure; and
a secondary ring gear in meshing engagement with each of said plurality of secondary planet gears, said secondary ring gear comprises a secondary output component, said secondary ring gear operably affixed to said hub such that said hub rotates at a rotational speed slower than said primary input component and said secondary input component when power is transmitted through said primary and secondary planetary stages.

17. The wheel drive transmission unit of claim 16, further comprising an arrangement of pins and bearings rotatably coupling each of said plurality of secondary planet gears to said secondary planet gear carrier.

18. A wheel drive transmission unit comprising:
a spindle defining a longitudinal spindle axis, said spindle configured to affix to a vehicle frame at an input side of the transmission unit;
a hub defining a longitudinal hub axis, said hub rotatable with respect to said spindle about said longitudinal hub axis and configured to affix to a driven wheel at an output side of the transmission unit;
a primary planetary stage comprising:
a primary input component positioned and configured to receive power from a vehicle power source;
a plurality of primary planet gears in meshing engagement with said primary input component;
a primary planet gear carrier rotatably attached to each of said plurality of primary planet gears, said primary planet gear carrier including an output-side surface comprising a plurality of recesses formed therein; and
a primary ring gear in meshing engagement with each of said plurality of primary planet gears;
a secondary planetary stage comprising:
a secondary input component including a sun gear portion and a plurality of face splines protruding axially away from said sun gear portion, said secondary input component axially moveable to selectively engage or disengage said face splines with said recesses of said primary planet gear carrier, such that said secondary input component receives power from said primary planet gear carrier when said secondary input component is axially moved into its engaged position;

a plurality of secondary planet gears in meshing engagement with said secondary input component;

a secondary planet gear carrier rotatably attached to each of said plurality of secondary planet gears; and a secondary ring gear in meshing engagement with each of said plurality of secondary planet gears, said secondary ring gear operably affixed to said hub such that said hub rotates at a rotational speed slower than said primary input component and said secondary input component when said face splines of said secondary input component are engaged with said recesses of said primary planet gear carrier.

19. The wheel drive transmission unit of claim 18, wherein said face splines of said secondary input component are urged into contact with said recesses of said primary planet gear carrier by a biasing element.

20. The wheel drive transmission unit of claim 19, further comprising a lever axially fixed to said secondary input component, said lever in abutting engagement with a cam surface formed on the wheel drive transmission unit, said cam surface shaped to axially displace said lever and said secondary input component between the engaged and disengaged positions of said face splines with respect to said recesses.

21. The wheel drive transmission unit of claim 20, wherein said cam surface includes a land when said lever is engaged with said cam surface with said secondary input component in its disengaged position, said land cooperating with said lever to maintain said secondary input component in its disengaged position.

22. The wheel drive transmission unit of claim 18, wherein said sun gear portion and said plurality of face splines are monolithically formed as a single piece.

23. The wheel drive transmission unit of claim 18, wherein said recesses are monolithically formed as a part of said primary planet gear carrier.

\* \* \* \* \*

UNITED STATES PATENT AND TRADEMARK OFFICE
CERTIFICATE OF CORRECTION

PATENT NO. : 9,950,562 B2  
APPLICATION NO. : 14/438158  
DATED : April 24, 2018  
INVENTOR(S) : Forrest et al.

It is certified that error appears in the above-identified patent and that said Letters Patent is hereby corrected as shown below:

Claim 7, Column 14, Line 67, before "tertiary" insert --a--

Signed and Sealed this  
Third Day of July, 2018

Andrei Iancu  
*Director of the United States Patent and Trademark Office*